United States Patent
Kleinhoffer et al.

[11] Patent Number: 5,954,390
[45] Date of Patent: Sep. 21, 1999

[54] VEHICLE DYNAMIC SIDE IMPACT SYSTEM

[75] Inventors: Richard Kleinhoffer, Macomb Township; Eugene M. Schoenherr, Shelby Township; Shing Lo, Ann Arbor; James Chapp, Jr., West Bloomfield, all of Mich.

[73] Assignee: Chrysler Corporation, Auburn Hills, Mich.

[21] Appl. No.: 08/993,248

[22] Filed: Dec. 18, 1997

[51] Int. Cl.⁶ .................................................. B62D 27/02
[52] U.S. Cl. ................... 296/203.01; 296/188; 296/205; 296/68.1
[58] Field of Search ............................ 296/68.1, 63, 188, 296/203.01, 203.03, 204, 205, 209, 65.13

[56] References Cited

U.S. PATENT DOCUMENTS

| | | | |
|---|---|---|---|
| 2,647,791 | 8/1953 | Barenyi | 296/209 |
| 2,710,222 | 6/1955 | Barenyi . | |
| 4,451,078 | 5/1984 | Maeda | 296/188 |
| 4,768,808 | 9/1988 | DeRees | 280/796 |
| 4,790,974 | 12/1988 | Perkins et al. . | |
| 4,903,791 | 2/1990 | Cameron et al. | 180/905 |
| 5,000,509 | 3/1991 | Sinnhuber et al. | 296/188 |
| 5,080,410 | 1/1992 | Stewart et al. | 293/102 |
| 5,080,412 | 1/1992 | Stewart et al. | 293/155 |
| 5,282,637 | 2/1994 | McCreadie | 296/194 |
| 5,340,178 | 8/1994 | Stewart et al. | 293/122 |
| 5,352,011 | 10/1994 | Kihara et al. | 296/203.03 |
| 5,354,115 | 10/1994 | Esaki | 296/209 |
| 5,364,159 | 11/1994 | Kelman et al. | 296/192 |
| 5,435,618 | 7/1995 | Sacco et al. | 296/68.1 |
| 5,464,266 | 11/1995 | Guertler | 296/189 |
| 5,549,349 | 8/1996 | Corporon et al. | 296/188 |
| 5,580,121 | 12/1996 | Dange et al. | 296/186 |
| 5,584,525 | 12/1996 | Nakano et al. | 296/68.1 |
| 5,669,626 | 9/1997 | Bartos et al. | 280/732 |

FOREIGN PATENT DOCUMENTS

| | | | |
|---|---|---|---|
| 527028 | 5/1955 | Italy | 296/203.01 |
| 3607855 | 9/1987 | Italy | 296/188 |

*Primary Examiner*—Dennis H. Pedder
*Attorney, Agent, or Firm*—William J. Coughlin

[57] ABSTRACT

A cross-car beam extends laterally between a pair of upwardly directed B-pillars on opposite sides of a vehicle passenger compartment and is structurally and functionally interconnected with each of the B-pillars. The cross-car beam provides the sole support for the rearward bottom portion of the front seat assemblies and preferably the hand brake, thus eliminating the need for stanchions supporting these assemblies. The cross-car beam is spaced above the floor of the passenger compartment and has a rearwardly and upwardly sloped portion of its lower surface, thus providing greatly enhanced foot space for rear seat passengers. In an alternate embodiment, the cross-car beam protrudes into at least a portion of each B-pillar assembly and can also be used to temporarily locate and support the body side aperture assembly prior to its being welded in its final location on the assembly line.

25 Claims, 5 Drawing Sheets

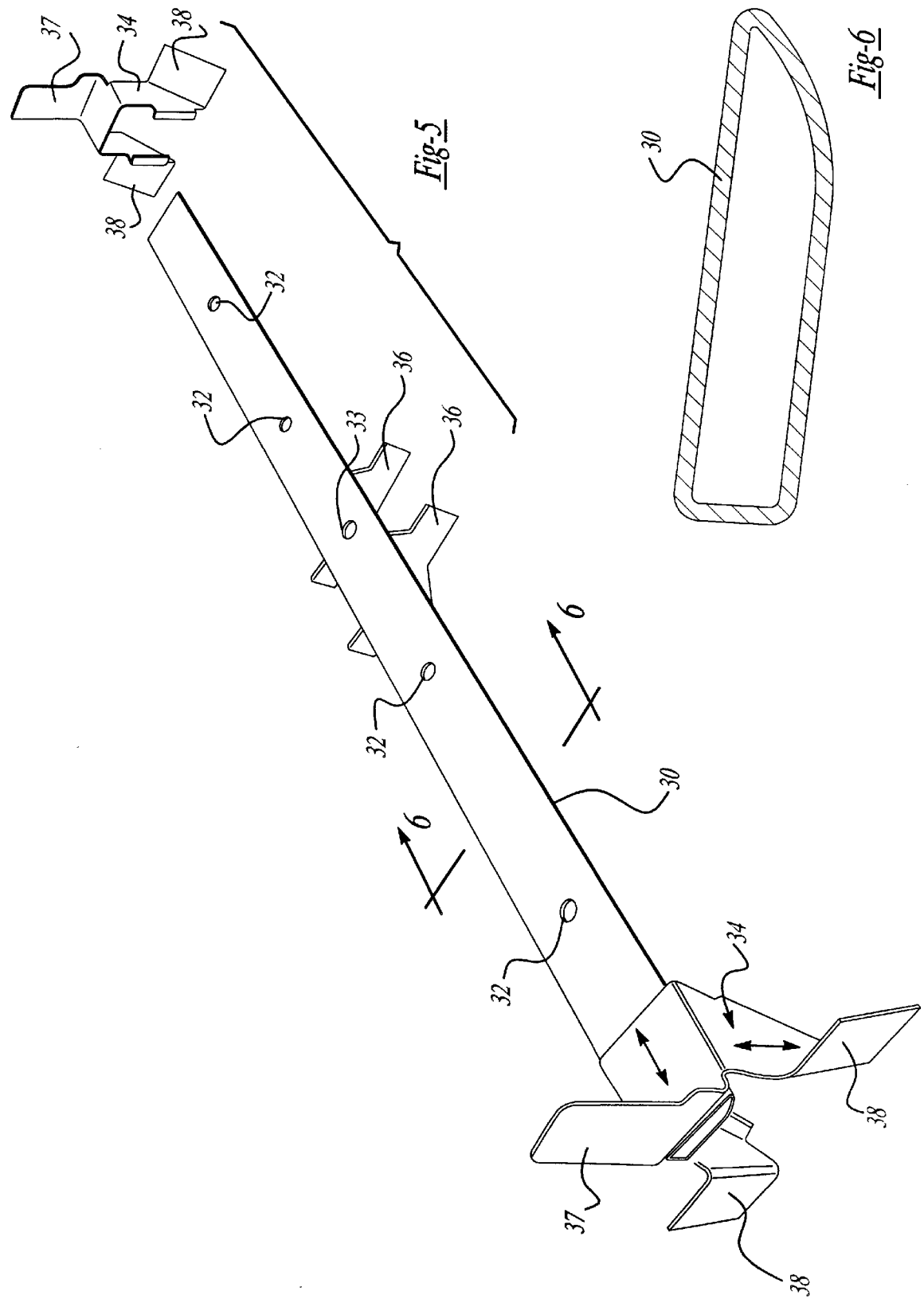

VEHICLE DYNAMIC SIDE IMPACT SYSTEM

BACKGROUND AND SUMMARY OF THE INVENTION

The invention relates generally to dynamic side impact protection apparatuses or systems for automobiles or other vehicles, and more specifically to such systems employing a structural cross beam extending laterally across and through the interior passenger compartment of the vehicle to interconnect the vehicle sides.

For many years, automobile manufacturers have gone to great lengths to improve the safety and crash worthiness of their vehicles. Such efforts have taken many forms in the final vehicle product, including those directed toward improving and maintaining the integrity of the passenger compartment in response to a side impacts. Although such efforts and emphasis have gone far toward continually improving the safety of vehicles, such efforts continue in the present and are expected to continue and grow well into the future.

As a result of this safety emphasis on the part of automobile manufacturers, governments, and the public at large, new crash or collision standards have required the provision of a dynamic side impact apparatus or system that laterally interconnects the sides of the vehicle in order to better maintain the integrity of the passenger compartment in response to side impact collisions. According to the present invention, this objective is addressed by way of a cross-car dynamic side impact beam mounted within the passenger compartment and extending laterally between a pair of upwardly directed B-pillars on opposite sides of the passenger compartment. The cross-car beam can be structurally and functionally interconnected with each of the B-pillars either directly or by way of intermediate components or structures, thus adding greatly to the lateral strength of the passenger compartment.

In addition, the present invention provides improved passenger comfort, as well as safety. The cross-car beam provides the sole support for the rearward bottom portion of the front seat assembly or assemblies, thus eliminating the need for one or more stanchions or similar structures for supporting the rear of the seat assemblies. This, coupled with the cross-car beam according to the present invention being spaced vertically above the floor of the passenger compartment and having at least a portion of its lower surface sloping or curving rearwardly and upwardly, provides greatly enhanced foot space and comfort for rear seat passengers, in most cases greater than that provided by vehicles not so equipped with a dynamic side impact cross-car beam.

In one embodiment of the present invention, the ends of the cross-car beam are disposed adjacent to, and are structurally and functionally interconnected with, inner portions of the B-pillar assemblies. In another, alternate embodiment of the present invention, the cross-car beam protrudes into at least a portion of each B-pillar assembly, extending through an inner portion or member of such B-pillar assemblies. In this alternate construction, the opposite outer ends of the cross-car beam can also be used to temporarily locate and support the body side aperture assembly (or other vehicle side structure that includes the B-pillar assembly) prior to its being welded or otherwise fixed in its final location on the assembly line. This feature greatly simplifies this step of the assembly operation and reduces both the time and cost required to accomplish it.

In either of the above-mentioned embodiments or constructions according to the present invention, the cross-car beam is also adapted to support a hand or parking brake assembly. Similarly, in vehicles having central interior floor consoles, the cross-car beam is further interconnected with a rearward console bracket, or can alternatively support a rearward portion of the console itself. Thus, conventional structures for supporting these vehicle components are eliminated, along with their associated costs and weight.

The cross-car beam assembly according to the present invention preferably also includes opposite end brackets for interconnecting the cross-car beam to the B-pillar assembly, by way of the end brackets being fixedly attached to the B-pillar and/or the lower side sill members of the passenger compartment. These preferred end brackets are adapted to be temporarily slidably movable laterally along the length of the cross-car beam, as well as being positionable relative to the vehicle's side structures, both upwardly and downwardly and forwardly and rearwardly along with the beam, prior to their being fixed to the cross-car beam and the B-pillars and/or side sill members after the cross-car beam is disposed in its final location. In this regard, the final location of the cross-car beam is determined by the location of, and its connection to, the rearward lower portion of the front seat assembly or assemblies prior to the welding or other fixing of the end brackets. Therefore, because of this "floating" pre-assembly feature of the cross-car beam end brackets, the mounting tracks or other lower mounting structures of the front seat assembly or assemblies are maintained in their proper positions and orientations, thus preventing or at least minimizing any non-parallelism or any binding in the adjustable forward and rearward movement of the seat assembly.

Additional objects, advantages, and features of the present invention will become apparent from the following description and appended claims, taken in conjunction with the accompanying drawings.

BRIEF DESCRIPTION OF THE DRAWINGS

FIG. 5 is a perspective view of the cross-car beam and its associated end brackets.

FIG. 6 is a cross-sectional view taken generally along line 6—6 of FIG. 5.

DETAILED DESCRIPTION OF THE PREFERRED EMBODIMENTS

Figure 1:
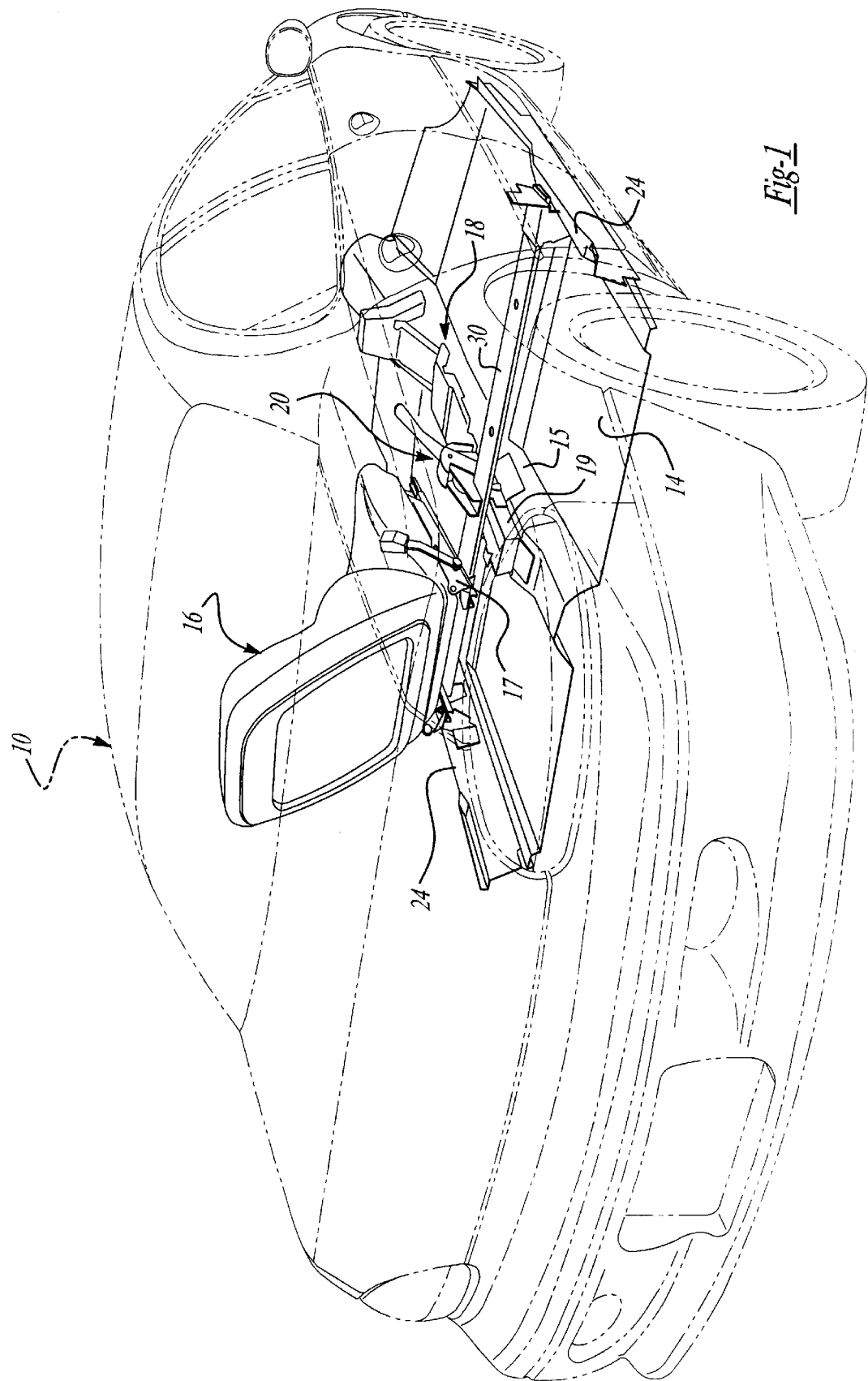
FIG. 1 is a rear perspective view of a vehicle (the body of which is shown in phantom lines) having a cross-car beam arrangement according to the present invention installed in its passenger compartment.

FIGS. 1 through 8 depict exemplary embodiments of the present invention, for purposes of illustration only, as applied to a passenger car vehicle. Those skilled in the art will readily recognize, from the following discussion and the referenced drawing figures, that the present invention is equally applicable to other types of vehicles, including those not equipped with a rear seat compartment. One skilled in the art will also readily recognize that the particular shapes and configurations of the components shown for purposes of illustration in the drawings can be altered or modified in order to suit a particular vehicular application.

Figure 2:
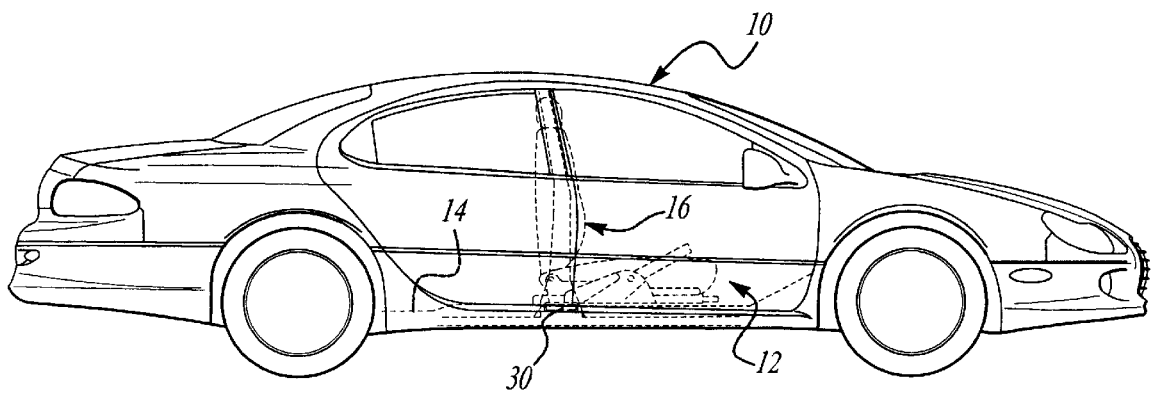
FIG. 2 is a side view of the vehicle of FIG. 1, illustrating some of the passenger compartment components in hidden lines.

FIGS. 1 and 2 illustrate a vehicle 10 having an interior passenger compartment 12. The passenger compartment 12 typically includes a floor 14 with a longitudinally-extending central tunnel 15, which provides space for brake lines, electrical lines, drive propeller shafts, or other underbody components extending longitudinally through the center of the vehicle.

The vehicle 10 also includes one or more front seat assemblies 16, which are typically adjustably movable forwardly and rearwardly on a seat mounting track or other such mounting structure 17. Frequently, especially in vehicles having front bucket seat assemblies, a central floor console assembly 18 (attached to the tunnel 15 by way of a console bracket 19) is provided for storage or passenger and driver convenience and extends longitudinally through the passenger compartment 12, usually along an upper portion of the tunnel 15. Typically, a parking or hand brake assembly 20 is disposed on the console assembly 18 or other central portion of the vehicle where it can be readily reached by the vehicle operator. In this regard, it should be noted that the present invention is equally applicable to vehicles having flat floor structures with no such tunnel 15 extending longitudinally down the central portion thereof.

Figure 4:
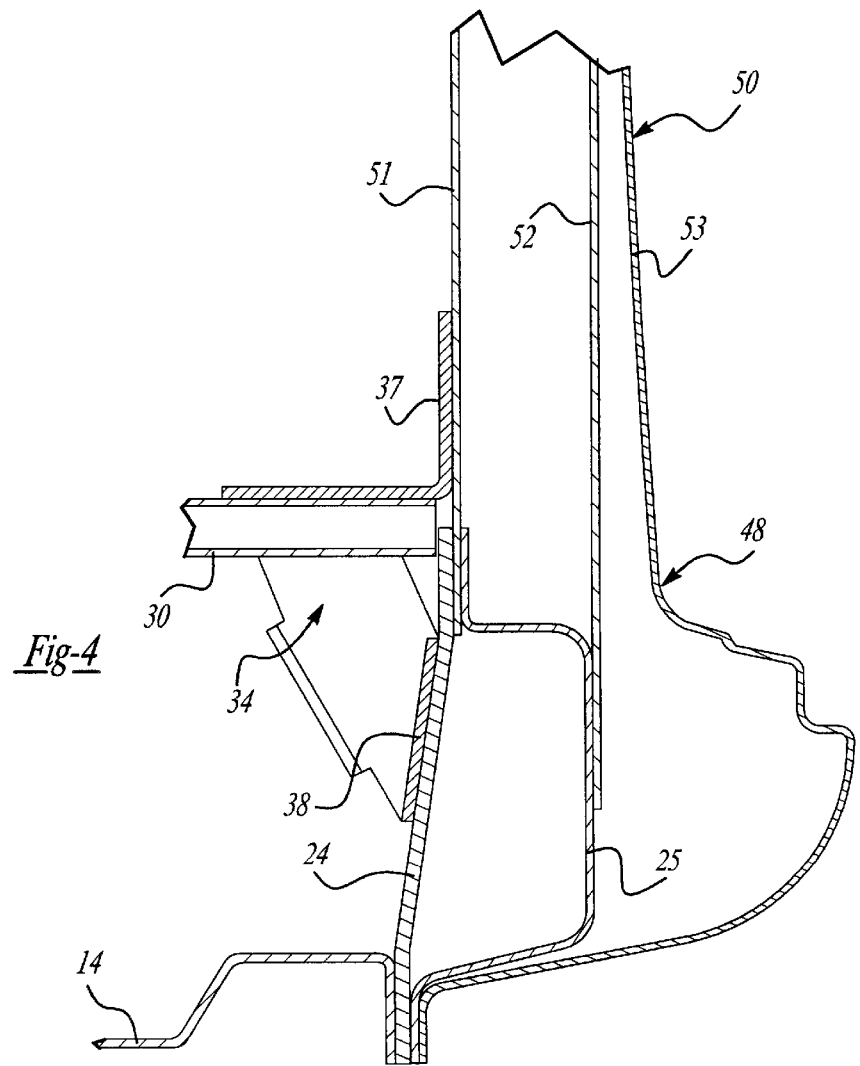
FIG. 4 is a partial cross-sectional view, taken generally along line 4—4 of FIG. 3, illustrating the interconnection of the cross-car beam and its end brackets with the B-pillar assembly.
Figure 3:
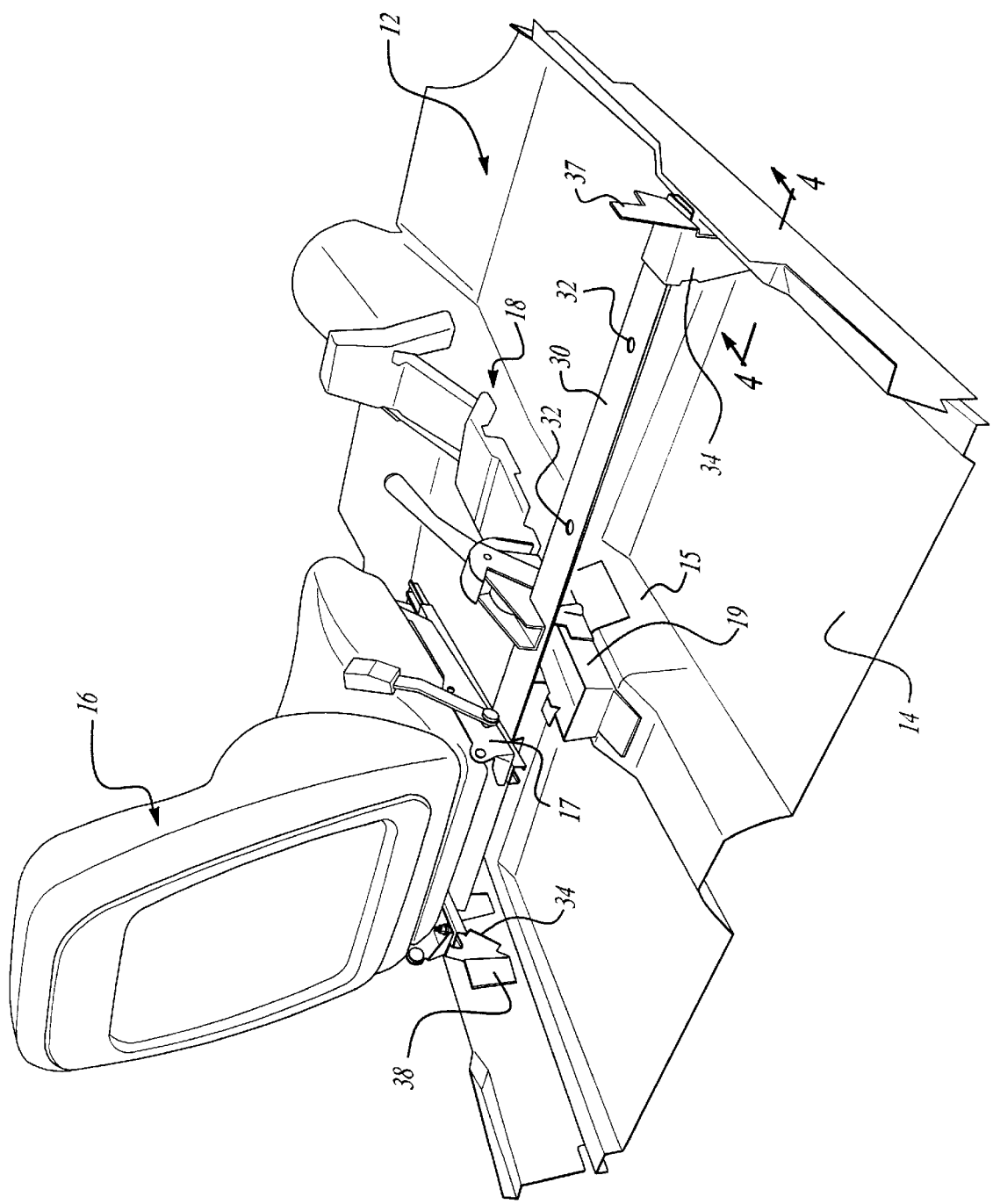
FIG. 3 is a rear perspective view of the interior passenger compartment of the vehicle of FIGS. 1 and 2, illustrating the major components of the dynamic side impact system according to the present invention.

In FIGS. 3 through 5, the interior passenger compartment 12 is illustrated in more detail, but with certain other portions of the vehicle's surrounding structure removed for purposes of clarity. A dynamic side impact cross-car beam 30 extends laterally across the passenger compartment 12 and is spaced above the floor 14 and the tunnel 15 (in vehicles so-equipped). As is shown in FIGS. 3 and 5, the cross-car beam 30 includes a number of seat mounting holes (or other seat attachment structure) 32 provided for mounting the rearward lower portion of the front seat assembly 16, or more specifically, the seat mounting/adjustment track 17, directly to the cross-car beam 30. Preferably the cross-car beam provides the sole support for such rearward lower portion of the seat assembly 16 and the mounting track 17. Similarly, as is shown in FIG. 5, a hand brake mounting hole (or other attachment structure) 33 is provided generally at a central portion of the cross-car beam 30 in order to allow the parking or hand brake assembly 20 to be mounted directly to the cross-car beam 30.

As is shown in FIG. 6, although the cross-car beam 30 can be typically tilted downwardly and rearwardly to match the orientation of the seat mounting track 17, it has a preferred cross-sectional shape with at least a rearward portion of its lower surface sloping or curving upwardly and rearwardly. Along with the above-mentioned spacing of the cross-car beam 30 above the floor 14 of the passenger compartment and the elimination of stanchions or other floor-mounted vertical supports for the seat assemblies 16, this feature provides greatly enhanced clearance beneath the seat assemblies 16, thus providing rear seat passengers with greatly improved leg and foot room and enhanced comfort.

A pair of end brackets 34 are provided at opposite ends of the cross-car beam 30 and serve to structurally and functionally interconnect the cross-car beam 30 with the side sills 24 and the B-pillar assemblies of the vehicle 10, as is described in more detail below. One or more central stanchions 36 are preferably provided to give added vertical support to the central portion of the beam 30. The end brackets 34, which each include an upper flange portion 37 and a pair of lower flange portions 38, are adapted to abut and be welded or otherwise fixedly secured to interior side sills 24 and B-pillar assemblies 50, as shown in FIG. 4. The B-pillar assemblies 50, which include the B-pillar inner and outer portions 51 and 53, respectively, as well as the B-pillar reinforcing member 52, are part of a pair of body side aperture assemblies or structures 48.

During assembly of the vehicle, the cross-car beam 30 is first positioned by way of a positioning fixture relative to the front seat assembly floor mounting structure (e.g., a front seat assembly front or forward cross-member). Once the beam 30 is located and set in its final position, the end brackets 34 (whose fore and aft positions and upward and downward positions have been established along with the beam) can be slid laterally outwardly in opposite directions along the beam 30. Then, once the side sills 24 become attached to, and supported by, the sill reinforcing members 25 and the B-pillar inner portions 51, the end brackets 34 can be welded or otherwise fixed to the cross-car beam 30, the side sill 24, and then the B-pillar inner portion 51.

Alternatively, the cross-car beam 30 can be first attached to the rearward lower seat mounting tracks 17 or other such structures of the front seat assembly 16. This seat and beam assembly can then alternatively be installed within the passenger compartment of the vehicle with the end brackets 34 still being unsecured and slidably movable along the lateral length of the cross-car beam 30. Once the seat and beam assembly is located in its final location and the front portions of the seats are fixedly attached to, or interconnected with, the floor 14 in this alternate assembly operation, the final location and orientation of the cross-car beam 30 is then established. The end brackets 34 can then slide laterally outwardly in opposite directions along the cross-car beam 30 until their lower flanges 38 contact the side sills 24, once they have been attached to, and supported by, the sill reinforcing members 25 and the B-pillar inner portions 51. Similarly, as in the preferred assembly operation described above, the upper flanges 37 contact the B-pillar inner portions 51 of the B-pillar assembly 50, and the end brackets 34 are then welded or otherwise fixed to the cross-car beam 30, the side sill 24, and then the B-pillar inner portion 51. In either assembly operation, the cross-car beam 30 and the end brackets 34 are allowed to "float", with their final positions being determined and established relative to the front seat assemblies in order to prevent seat track misalignment or binding.

By way of the cross-car beam 30 installation described above, the cross-car beam 30 is structurally, functionally and fixedly interconnected with the B-pillar assembly 50 by way of the end brackets 34 and also by way of the side sill structures 24. This provides great side impact collision protection, as well as improved passenger compartment integrity in the face of such side impacts.

Figure 7:
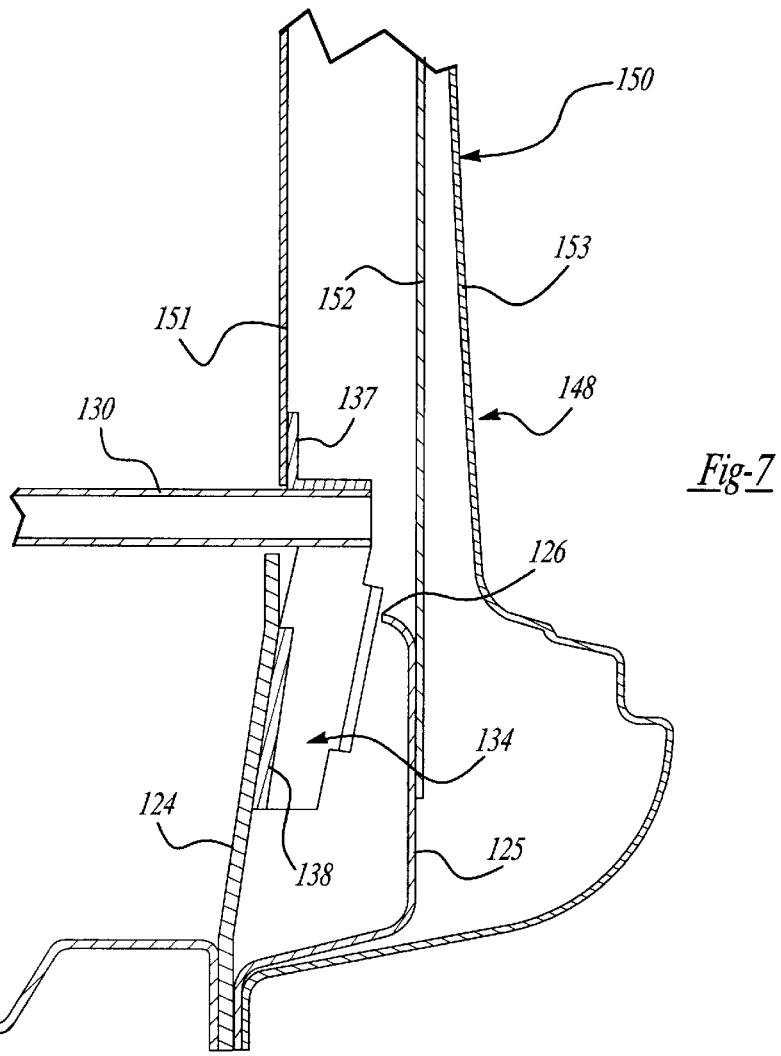
FIG. 7 is a partial cross-sectional view similar to that of FIG. 4, but illustrating another preferred alternate embodiment of the present invention, with a lengthened cross-car beam extending through an inner portion or inner member of the B-pillar assembly.

FIG. 7 is a cross-sectional view similar to that of FIG. 4, but illustrating an alternate embodiment of the present invention having an elongated dynamic side impact cross-car beam 130 installed within the passenger compartment. Many of the components depicted in FIG. 7 are the same or very similar, in terms of their configurations and functions, to corresponding components of FIG. 4. Therefore, such corresponding components are indicated by similar reference numerals in these Figures, but with those of FIG. 7 having one-hundred prefixes.

In FIG. 7, the cross-car beam 30 extends laterally outwardly substantially completely through the B-pillar inner members 151 and into or through a cut-out opening 126 in the sill reinforcing member 125, with the beam's opposite ends terminating at or closely adjacent the B-pillar reinforcing member 152. By such a construction, side impact forces are transmitted more directly and more rapidly to the stiff cross-car beam 30 in the event of collapse of the B-pillar outer member 153 during side impact, without the B-pillar reinforcing member 152 having to first collapse toward the B-pillar inner member 151. In this alternate construction, which may be preferred in many applications, the assembly procedure can be in accordance with either of those discussed above.

Figure 8:
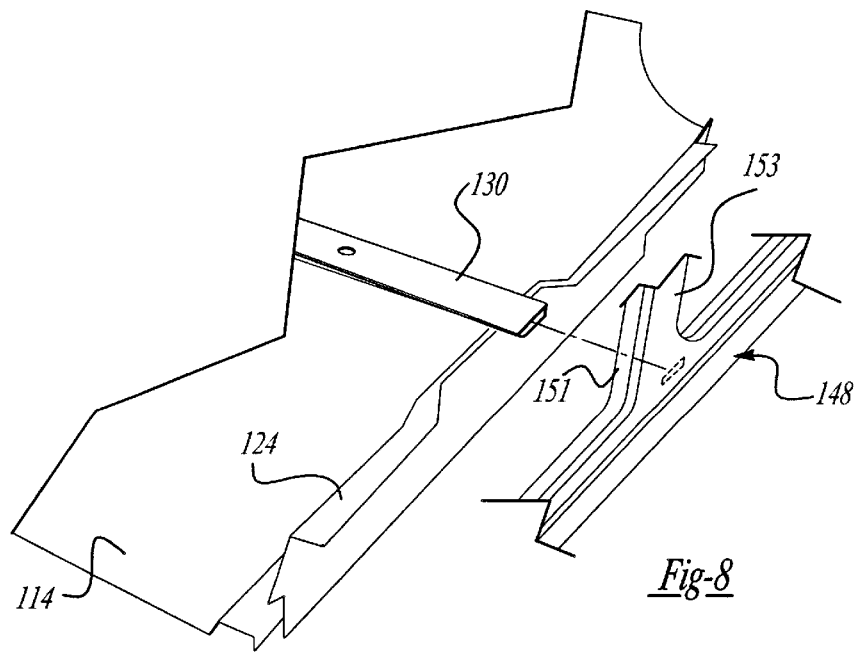
FIG. 8 is a diagrammatic view illustrating the use of the lengthened cross-car beam (shown in FIG. 7) for temporarily holding the vehicle's body side aperture structure or other such vehicle side structure assembly in place prior to its being welded or otherwise fixedly attached to the remainder of the vehicle.

In addition, as is diagrammatically or schematically illustrated in FIG. 8, the extended-length cross-car beam 130 of FIG. 7 (but with the end cap 134 removed for clarity) also serves the function of temporarily supporting the body side aperture assembly 148 prior to its being welded or otherwise fixedly attached to the remainder of the vehicle during vehicle assembly. This is accomplished due to the cross-car beam 130 extending substantially through the B-pillar inner portion 151. This feature offers the advantage of simplifying, expediting, and reducing the cost of, this step in the vehicle assembly procedure. This is because no temporary hooks, pins, or so-called bent-over "toy tabs", which are typically required to temporarily hold the body side aperture assembly 148 in place until it can be welded or otherwise fixedly attached to the remainder of the vehicle, are needed. Also, this arrangement eliminates the need to cut or grind off such hooks, pins or tabs after the body side aperture assembly is permanently installed in place. As a result, the economy, ease and speed of this step are greatly enhanced.

The foregoing discussion discloses and describes merely exemplary embodiments of the present invention for purposes of illustration only. One skilled in the art will readily recognize from such discussion, and from the accompanying drawings and claims, that various changes, modifications, and variations can be made therein without departing from the spirit and scope of the invention as defined in the following claims.

What is claimed is:

1. In a vehicle having a passenger compartment, a cross-car beam mounted in said passenger compartment and extending laterally between a pair of upwardly-directed pillar assemblies on opposite sides of the passenger compartment, said cross-car beam being fixedly connected with each of said pillar assemblies, said cross-car beam being disposed under a rearward bottom section of a front seat assembly and being the sole support for said rearward bottom section of said front seat assembly, said cross-car beam being spaced vertically above a floor of the passenger compartment, said cross-car beam including an end bracket at each opposite end thereof for fixedly connecting said cross-car beam to said pillar assemblies, said end brackets being movable laterally with respect to said beam and vertically along with said cross-car beam with respect to said vehicle prior to being fixedly connected to said pillar assemblies in order to accommodate variations in the relative positions of said opposite ends of said cross-car beam and said pillar assemblies during assembly of the vehicle.

2. The invention according to claim 1, wherein said cross-car beam has said opposite ends extending through inner portions of said pillar assemblies.

3. The invention according to claim 2, wherein each of said upwardly-directed pillar assemblies includes a first inner pillar member and a second pillar member spaced laterally outward of said first pillar member, said pillar members being fixedly interconnected with one another, said cross-car beam having opposite ends extending completely through said first inner pillar members and terminating adjacent said second pillar members.

4. A The invention according to claim 1, wherein said cross-car beam also supports a hand brake assembly.

5. The invention according to claim 4, wherein said front seat assembly comprises a pair of bucket-style seats and said cross-car beam is further interconnected with a console bracket at a rearward portion of a console disposed between said bucket-style seats.

6. The invention according to claim 1, wherein said cross-car beam has a lower surface, at least a rearward portion of said lower surface extending upwardly and rearwardly.

7. The invention according to claim 6, wherein said rearward portion of said cross-car beam lower surface has a radiused rearward edge.

8. The invention according to claim 1, wherein each of said upwardly-directed pillar assemblies includes an inner pillar surface, said cross-car beam having opposite ends inwardly adjacent said inner pillar surfaces.

9. The invention according to claim 1, wherein the final fixed location of said cross-car beam is defined by the location of said front seat assembly prior to said end brackets being fixed in their final locations adjacent said pillar assemblies.

10. In a vehicle having a passenger compartment having a floor, a cross-car beam mounted in said passenger compartment and extending laterally between a pair of upwardly-directed pillar assemblies on opposite sides of the passenger compartment, said cross-car beam being fixedly connected with each of said pillar assemblies, said cross-car beam being disposed under a rearward bottom section of a front seat assembly and being the sole support for said rearward bottom section of said front seat assembly, said cross-car beam being spaced vertically above the floor of the passenger compartment and having at least a rearward portion of a lower surface thereof extending generally upwardly and rearwardly relative to the floor, said cross-car beam including an end bracket at each opposite end thereof for fixedly connecting said cross-car beam to said pillar assemblies, said end brackets being movable laterally with respect to said beam and vertically along with said cross-car beam with respect to said vehicle prior to being fixedly connected to said pillar assemblies in order to accommodate variations in the relative positions of said opposite ends of said cross-car beam and said pillar assemblies during assembly of the vehicle.

11. The invention according to claim 10, wherein said rearward position of said cross-car beam lower surface has a radiused rearward edge.

12. The invention according to claim 10, wherein said cross-car beam also supports a hand brake assembly and is interconnected with a console bracket at a rearward portion of a console, said console bracket and said hand brake assembly being disposed generally adjacent a lateral midpoint of said passenger compartment.

13. The invention according to claim 10, wherein each of said upwardly-directed pillar assemblies includes an inner pillar surface, said cross-car beam having opposite ends inwardly adjacent said inner pillar surfaces.

14. The invention according to claim 10, wherein said cross-car beam has opposite ends extending through an inner portion of each of said pillar assemblies.

15. The invention according to claim 14, wherein each of said upwardly-directed pillar assemblies includes a first inner pillar member and a second pillar member spaced laterally outward of said first pillar member, said pillar members being fixedly interconnected with one another, said cross-car beam having opposite ends extending completely through said first inner pillar members and terminating adjacent said second pillar members.

16. The invention according to claim 10, wherein the final fixed location of said cross-car beam is defined by the location of said front seat assembly prior to said end brackets being fixed in their final locations adjacent said pillar assemblies.

17. In a vehicle having a passenger compartment, a cross-car beam mounted in said passenger compartment and extending laterally between a pair of upwardly-directed pillar assemblies on opposite sides of the passenger compartment, said cross-car beam being fixedly connected with each of said pillar assemblies, said cross-car beam being disposed under a rearward bottom section of at least one front seat assembly and being the sole support for said rearward bottom section of said front seat assembly, said cross-car beam being spaced vertically above a floor of the passenger compartment, said cross-car beam also supporting a hand brake assembly, and said cross-car beam further being interconnected with a console bracket at a rearward portion of a console disposed inwardly of said front seat assembly, said cross-car beam including an end bracket at each of its opposite ends for fixedly connecting said opposite ends with said pillar assemblies, said end brackets being movable laterally with respect to said beam and vertically along with said cross-car beam with respect to said vehicle prior to said end brackets being fixedly connected to said pillar assemblies in order to accommodate variations in the relative positions of said opposite ends of said cross-car beam and said pillar assemblies during assembly of the vehicle.

18. The invention according to claim 17, wherein said cross-car beam has opposite ends extending through an inner portion of each of said pillar assemblies.

19. The invention according to claim 18, wherein each of said upwardly-directed pillar assemblies includes a first inner pillar member and a second pillar member spaced laterally outward of said first pillar member, said pillar members being fixedly interconnected with one another, said cross-car beam having opposite ends extending completely through said first inner pillar members and terminating adjacent said second pillar members.

20. The invention according to claim 17, wherein said cross-car beam has a lower surface, at least a rearward portion of said lower surface extending upwardly and rearwardly.

21. The invention according to claim 20, wherein said rearward position of said cross-car beam lower surface has a radiused rearward edge.

22. The invention according to claim 17, wherein each of said upwardly-directed pillar assemblies includes an inner pillar surface, said cross-car beam having opposite ends inwardly adjacent said inner pillar surfaces.

23. The invention according to claim 17, wherein the final fixed location of said cross-car beam is defined by the location of said front seat assembly prior to said end brackets being fixed in their final locations adjacent said pillar assemblies.

24. The invention according to claim 20, wherein each of said upwardly-directed pillar assemblies includes an inner pillar surface, said cross-car beam having said opposite ends inwardly adjacent said inner pillar surfaces.

25. The invention according to claim 20, wherein the final fixed location of said cross-car beam is defined by the location of said front seat assembly prior to said end brackets being slidably fixed in their final locations adjacent said pillar assemblies.

* * * * *